United States Patent
Isano et al.

(10) Patent No.: US 12,374,082 B2
(45) Date of Patent: Jul. 29, 2025

(54) DETECTION RESULT ANALYSIS DEVICE, DETECTION RESULT ANALYSIS METHOD, AND COMPUTER READABLE MEDIUM

(71) Applicant: Mitsubishi Electric Corporation, Tokyo (JP)

(72) Inventors: Shoto Isano, Tokyo (JP); Hitoshi Soma, Tokyo (JP); Mitsuyoshi Yamatari, Tokyo (JP); Takamasa Nakao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 345 days.

(21) Appl. No.: 17/880,333

(22) Filed: Aug. 3, 2022

(65) Prior Publication Data
US 2022/0375200 A1 Nov. 24, 2022

Related U.S. Application Data

(63) Continuation of application No. PCT/JP2021/000835, filed on Jan. 13, 2021.

(30) Foreign Application Priority Data

Mar. 10, 2020 (JP) .................. 2020-040424

(51) Int. Cl.
*G06V 10/00* (2022.01)
*G06V 10/20* (2022.01)
*G06V 10/764* (2022.01)

(52) U.S. Cl.
CPC .......... *G06V 10/764* (2022.01); *G06V 10/255* (2022.01)

(58) Field of Classification Search
CPC .... G06V 10/764; G06V 10/255; G06V 10/25; G06V 10/454; G06V 10/806; G06V 10/82; G06V 10/28; G06V 20/70; G06T 7/00
See application file for complete search history.

(56) References Cited

U.S. PATENT DOCUMENTS

2018/0005106 A1* 1/2018 Hachiya .................. G06N 3/045
2020/0410709 A1* 12/2020 Suzuki .................. G06N 3/084
(Continued)

FOREIGN PATENT DOCUMENTS

| CN | 110276366 A | * 9/2019 | ......... G06K 9/00624 |
| JP | 2018-10626 A | 1/2018 | |

(Continued)

OTHER PUBLICATIONS

Selvaraju et al, Grad-CAM Visual Explanations from Deep Networks via Gradient-based Localization, IEEE International Conference on Computer Vision, pp. 618-626 (Year: 2017).*

(Continued)

*Primary Examiner* — Xiao Liu
(74) *Attorney, Agent, or Firm* — Birch, Stewart, Kolasch & Birch, LLP

(57) ABSTRACT

An evaluation value calculation unit (22) focus on, as a target layer, each of a plurality of layers in an object detection model which detects a target object included in image data and which is constituted using a neural network, and calculates an evaluation value of the target layer from a heat map representing an activeness degree per pixel in the image data obtained from an output result of the target layer, and from a detection region where the target object is detected. A layer selection unit (23) selects at least some layers out of the plurality of layers on a basis of the evaluation value.

18 Claims, 15 Drawing Sheets

(56) References Cited

U.S. PATENT DOCUMENTS

| | | | |
|---|---|---|---|
| 2021/0034853 A1 | 2/2021 | Matsumoto et al. | |
| 2021/0089827 A1* | 3/2021 | Kumagai | G06N 3/045 |
| 2022/0319159 A1* | 10/2022 | Bakker | G06V 10/764 |

FOREIGN PATENT DOCUMENTS

| | | |
|---|---|---|
| JP | 2018-156586 A | 10/2018 |
| JP | 2019-95910 A | 6/2019 |
| JP | 2019-125204 A | 7/2019 |
| JP | 2019-133320 A | 8/2019 |
| JP | 2019-145040 A | 8/2019 |
| JP | 2019-153092 A | 9/2019 |
| JP | 2019-192082 A | 10/2019 |
| JP | 2019-197311 A | 11/2019 |
| JP | 2019-211913 A | 12/2019 |
| WO | WO 2019/138772 A1 | 7/2019 |
| WO | WO 2019/155628 A1 | 8/2019 |
| WO | WO 2019/167784 A1 | 9/2019 |

OTHER PUBLICATIONS

Huang et al., "Improving Object Detection with Inverted Attention", 2020 IEEE Winter Conference on Application of Computer Vision (WACV), total 12 pages.

International Search Report, issued in PCT/JP2021/000835, PCT/ISA/210, dated Apr. 13, 2021.

Written Opinion of the International Searching Authority, issued in PCT/JP2021/000835, PCT/ISA/237, dated Apr. 13, 2021.

Extended European Search Report for European Application No. 21767418.3, dated Jan. 5, 2023.

Zhou et al.,"Learning Deep Features for Discriminative Localization" 2016 Conference on Computer Vision and Pattern Recognition (CVPR), IEEE, 2016, pp. 2921-2929.

Chinese Office Action and Search Report for Chinese Application No. 202180017889.2, dated May 29, 2025, with English translation.

\* cited by examiner

ND COMPUTER READABLE MEDIUM

DETECTION RESULT ANALYSIS DEVICE, DETECTION RESULT ANALYSIS METHOD, AND COMPUTER READABLE MEDIUM

CROSS REFERENCE TO RELATED APPLICATIONS

This application is a Continuation of PCT International Application No. PCT/JP2021/000835 filed on Jan. 13, 2021, which claims priority under 35 U.S.C. § 119(a) to Patent Application No. 2020-040424 filed in Japan on Mar. 10, 2020, all of which are hereby expressly incorporated by reference into the present application.

TECHNICAL FIELD

The present invention relates to a technique of analyzing a detection result obtained by an object detection model constituted using a neural network.

BACKGROUND ART

Conventionally, a detection result obtained by an object detection model that detects a target object from image data is analyzed to identify learning data lacking in the object detection model (see Patent Literature 1).

When analyzing the detection result, a portion that is a basis of judgment by the object detection model is visualized. As a technique of visualizing the portion that is the basis of judgment, Gradient-weighted Class Action Mapping (GradCAM) is available.

The object detection model includes a 2-stage type model and a 1-stage type model. The 2-stage type model is a model that identifies a target object after narrowing down a Region of Interest (RoI) that indicates a range considered to be the target object. The 1-stage type model is a model that identifies an object and a position of the object by using a set of boundary boxes of particular sizes called anchor boxes.

CITATION LIST

Patent Literature

Patent Literature 1: JP 2019-192082 A

SUMMARY OF INVENTION

Technical Problem

Regarding the 2-stage type model, it is said that a pooling layer after narrowing down the RoI is suitable for visualization using GradCAM. On the other hand, regarding the 1-stage type model, the layer suitable for visualization by GradCAM differs depending on conditions such as a type of a target object and a size of the detected target object.

Even regarding the 2-stage type model, the pooling layer after narrowing down the RoI is not always best suitable for visualization by GradCAM.

An objective of the present disclosure is to make it possible to identify a layer suitable for visualizing a portion that is a basis of judgment by the object detection model.

Solution to Problem

A detection result analysis device according to the present disclosure includes:

an evaluation value calculation unit to focus on, as a target layer, each of a plurality of layers in an object detection model which detects a target object included in image data and which is constituted using a neural network, and to calculate an evaluation value of the target layer from a heat map representing an activeness degree per pixel in the image data obtained from an output result of the target layer, and from a detection region where the target object is detected; and a layer selection unit to select at least some layers out of the plurality of layers on a basis of the evaluation value calculated by the evaluation value calculation unit.

The evaluation value calculation unit calculates the evaluation value from a ratio of an activeness degree on an inside of the detection region and an activeness degree on an outside of the detection region, the activeness degree being represented by the heat map.

The evaluation value calculation unit calculates the evaluation value from a proportion of a sum of activeness degrees on the inside of the detection region to a sum of activeness degrees on the outside of the detection region.

The evaluation value calculation unit, if the activeness degree is higher than an activeness threshold value, converts the activeness degree into a conversion activeness degree corresponding to the activeness threshold value, and if the activeness degree is equal to or less than the activeness threshold value, converts the activeness degree into a conversion activeness degree corresponding to an activeness threshold value that is one-level lower than the activeness threshold value; and then calculates the evaluation value.

The layer selection unit selects a criterial number of layers out of layers each having an evaluation value higher than an evaluation threshold value.

The detection result analysis device further includes a synthesis unit to synthesize heat maps about the layers selected by the layer selection unit, thereby generating a synthesis map.

The synthesis unit focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

A detection result analysis method according to the present disclosure includes:

by an evaluation value calculation unit, focusing on, as a target layer, each of a plurality of layers in an object detection model which detects a target object included in image data and which is constituted using a neural network, and calculating an evaluation value of the target layer from a heat map representing an activeness degree per pixel in the image data obtained from an output result of the target layer, and from a detection region where the target object is detected; and by a layer selection unit, selecting at least some layers out of the plurality of layers on a basis of the evaluation value.

A detection result analysis program according to the present disclosure causes a computer to function as a detection result analysis device that performs:

an evaluation value calculation process of focusing on, as a target layer, each of a plurality of layers in an object detection model which detects a target object included in image data and which is constituted using a neural network, and calculating an evaluation value of the target layer from a heat map representing an activeness degree per pixel in the image data obtained from an output result of the target layer, and from a detection region where the target object is detected; and a layer selection process of selecting at least some layers out of the plurality of layers on a basis of the evaluation value calculated by the evaluation value calculation process.

Advantageous Effects of Invention

According to the present disclosure, an evaluation value of a layer is calculated from a heat map representing an activeness degree per pixel in image data, and from a detection region where a target object is detected. At least some layers out of a plurality of layers are selected on the basis of the calculation values. This makes it possible to identify a layer suitable for visualization.

DESCRIPTION OF EMBODIMENTS

Embodiment 1

* Description of Configuration *

Figure 1:
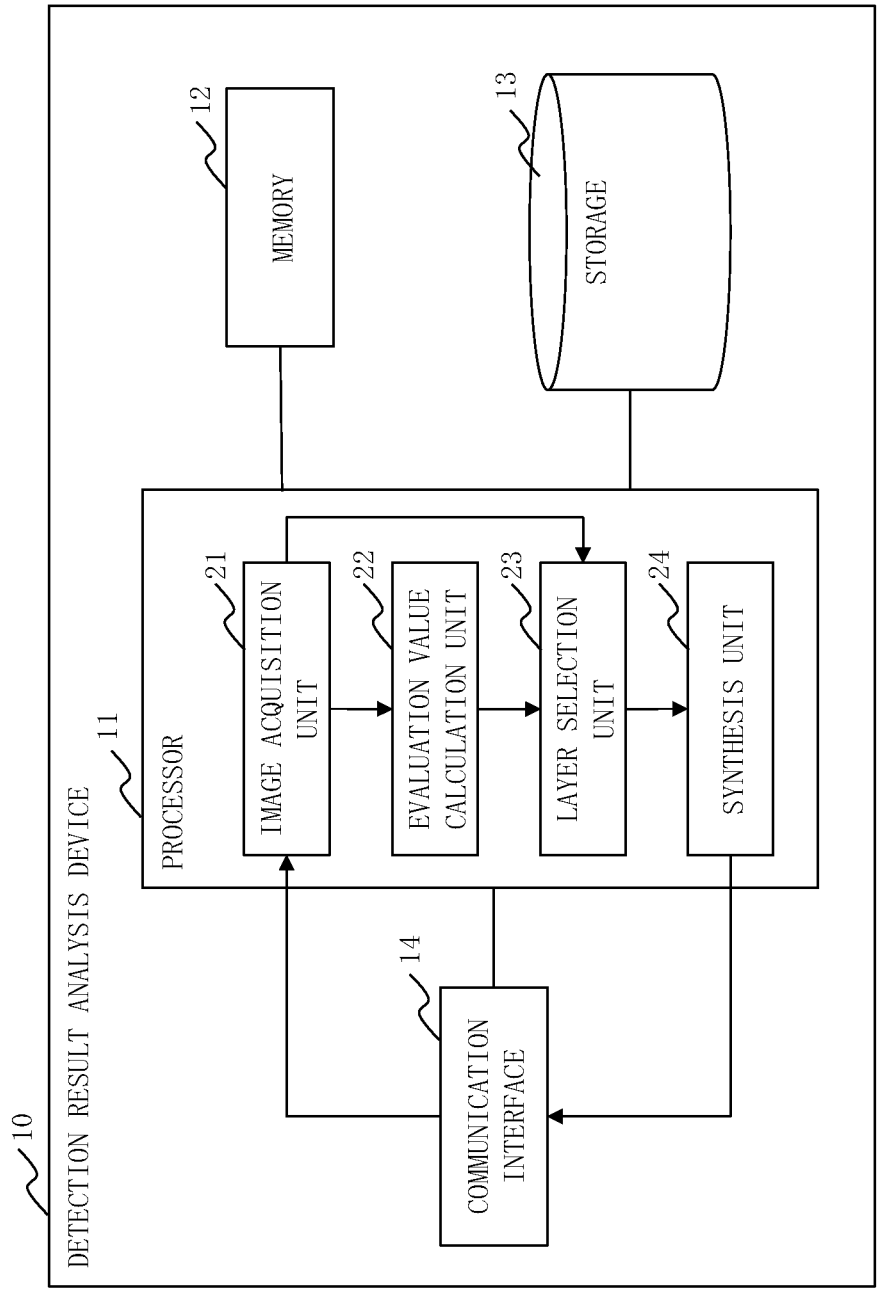
FIG. 1 is a configuration diagram of a detection result analysis device 10 according to Embodiment 1.

A configuration of a detection result analysis device 10 according to Embodiment 1 will be described with referring to FIG. 1.

The detection result analysis device 10 is a computer that identifies a layer suitable for visualizing a portion that is a basis of judgment by an object detection model.

The detection result analysis device 10 is provided with hardware devices which are a processor 11, a memory 12, a storage 13, and a communication interface 14. The processor 11 is connected to the other hardware devices via a signal line and controls the other hardware devices.

The processor 11 is an Integrated Circuit (IC) which performs processing.

Specific examples of the processor 11 are a Central Processing Unit (CPU), a Digital Signal Processor (DSP), and a Graphics Processing Unit (GPU).

The memory 12 is a storage device that stores data temporarily. Specific examples of the memory 12 are a Static Random-Access Memory (SRAM) and a Dynamic Random-Access Memory (DRAM).

The storage 13 is a storage device that keeps data. A specific example of the storage 13 is a Hard Disk Drive (HDD). The storage 13 may be a portable recording medium such as a Secure Digital (SD®) memory card, a Compact-Flash (CF®), a NAND flash, a flexible disk, an optical disk, a compact disk, a Blu-ray® Disc, and a Digital Versatile Disk (DVD).

The communication interface 14 is an interface for communicating with an external device. Specific examples of the communication interface 14 are an Ethernet® port, a Universal Serial Bus (USB) port, and a High-Definition Multimedia Interface (HDMI®) port.

The detection result analysis device 10 is provided with an image acquisition unit 21, an evaluation value calculation unit 22, a layer selection unit 23, and a synthesis unit 24, as function components. Functions of the individual function components of the detection result analysis device 10 are implemented by software.

A program that implements the functions of the individual function components of the detection result analysis device 10 is stored in the storage 13. This program is read into the memory 12 by the processor 11 and run by the processor 11. Hence, the functions of the individual function components of the detection result analysis device 10 are implemented.

FIG. 1 illustrates only one processor as the processor 11. However, there may be a plurality of processors 11. The plurality of processor 11 may cooperate with each other to run the program that implements the individual functions.

* Description of Operations *

Operations of the detection result analysis device 10 according to Embodiment 1 will be described with referring to FIGS. 2 through 6.

An operation procedure of the detection result analysis device 10 according to Embodiment 1 corresponds to a detection result analysis method according to Embodiment 1. A program that implements the operations of the detection result analysis device 10 according to Embodiment 1 corresponds to a detection result analysis program according to Embodiment 1.

Overall operations of the detection result analysis device 10 according to Embodiment 1 will be described with referring to FIG. 2.

The object detection model is a model that detects a target object included in image data. The object detection model is a model constituted using a neural network. As it is constituted using the neural network, the object detection model is constituted of a plurality of layers.

Figure 2:
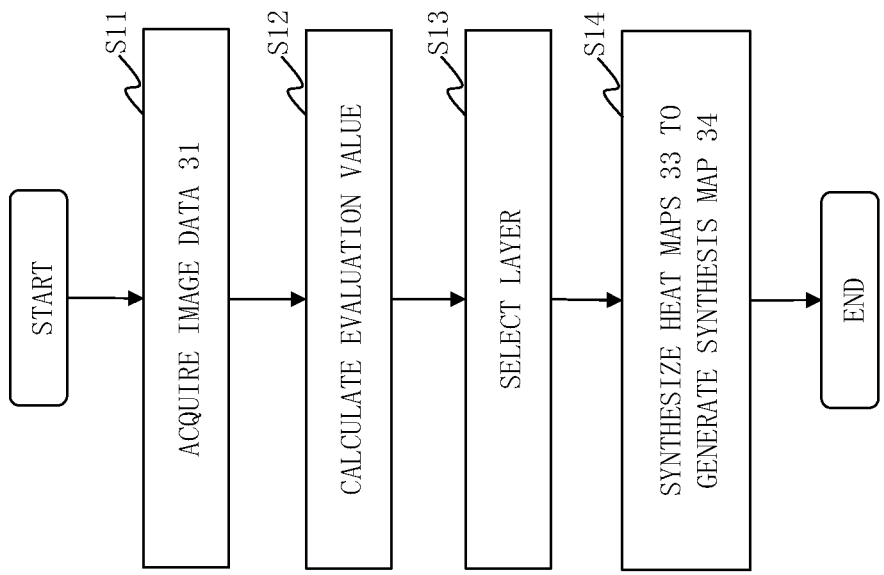
FIG. 2 is a flowchart illustrating overall operations of the detection result analysis device 10 according to Embodiment 1.

(Step S11 of FIG. 2: Image Acquisition Process)

The image acquisition unit 21 acquires image data 31 being a processing target.

Specifically, the image acquisition unit 21 reads the image data 31 being set in the storage 13 by a user of the detection result analysis device 10, thereby acquiring the image data 31.

(Step S12 of FIG. 2: Evaluation Value Calculation Process)

The evaluation value calculation unit 22 focuses on, as a target layer, each of the plurality of layers constituting the object detection model, and calculates an evaluation value of the target layer.

In this process, the evaluation value calculation unit 22 calculates the evaluation value from a heat map 33 representing an activeness degree per pixel in the image data 31 obtained from an output result of the target layer, and from a detection region 32 where a target object is detected from the image data 31 acquired in step S11.

The evaluation value calculation process according to Embodiment 1 will be described with referring to FIG. 3.

Figure 3:
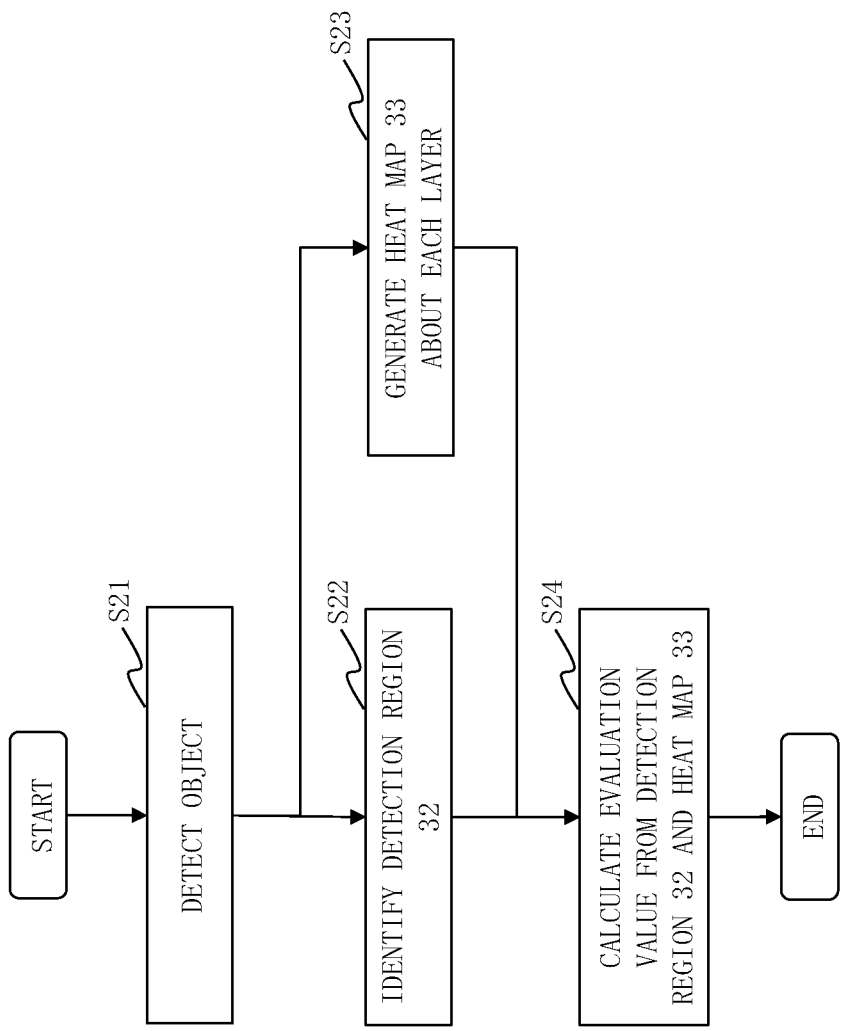
FIG. 3 is a flowchart of an evaluation value calculation process according to Embodiment 1.

(Step S21 of FIG. 3: Object Detection Result)

Figure 4:
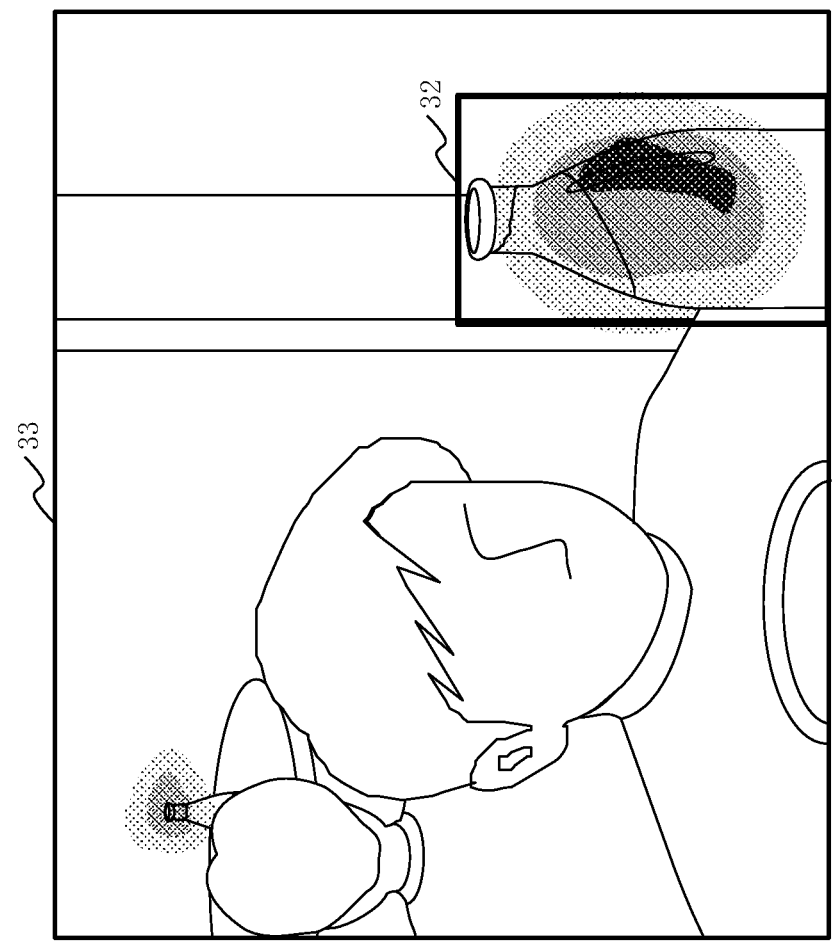
FIG. 4 is an explanatory diagram of the evaluation value calculation process according to Embodiment 1.

The evaluation value calculation unit 22 takes as input the image data 31 acquired in step S11 and detects the target object by the object detection model. A type of the target object may be specified in advance or may be specified by the user. FIG. 4 illustrates a case where a bottle is specified as the type of the target object.

(Step S22 of FIG. 3: Detection Region Identification Process)

The evaluation value calculation unit 22 identifies the detection region 32 which is a region where the target object is detected and which is identified by detecting the target object in step S21.

(Step S23 of FIG. 3: Heat Map Generation Process)

The evaluation value calculation unit 22 focuses on each of the plurality of layers constituting the object detection model, as the target layer, and generates the heat map 33.

Specifically, the evaluation value calculation unit 22 generates the heat map 33 about the target layer from an output result of the target layer obtained when detecting the target object in step S21. The heat map 33 represents an activeness degree per pixel in the image data 31 acquired in step S11. Note that in the heat map 33, a pixel with a higher activeness degree shows a larger value.

Out of the plurality of layers constituting the object detection model, the layer to be focused on as the target layer is only a layer, such as a convolution layer and a pooling layer, from which the heat map 33 can be generated, among the layers constituting the object detection model. The layer from which the heat map 33 can be generated specifically refers to a layer having a plurality of channels with two or more pixels in a vertical direction and two or more pixels in a horizontal direction and whose gradient can be calculated.

In Embodiment 1, all the layers from which the heat maps 33 can be generated are individually set as the target layers. However, out of all the layers from which the heat maps 33 can be generated, only some layers may be set as the target layers. For example, out of all the layers from which the heat maps 33 can be generated, only a certain layer and layers subsequent to it may be set as the target layers.

Out of the plurality of layers constituting the object detection model, the number of pixels in processing-target image data is smaller in a layer to be processed later. However, the evaluation value calculation unit 22 expands an output result of the target layer and generates the heat map 33 representing the activeness degree per pixel of the image data 31.

For example, there is a case that, in a certain layer, the number of pixels is ¼ that of the image data 31 acquired in step S11. In this case, one pixel represents four pixels of the image data 31. Hence, the evaluation value calculation unit 22 generates the heat map 33 on the premise that one pixel represents four pixels of the image data 31.

Depending on the object detection model, even in a layer to be processed later among the plurality of layers, the number of pixels of the image data in the output result may increase. The number of pixels in the output result may vary depending on the layer. In any case, the number of pixels in the output result may be increased or decreased to correspond to the number of pixels of the image data 31.

(Step S24 of FIG. 3: Evaluation Process)

The evaluation value calculation unit 22 focuses on, as the target layer, each of the plurality of layers from which the heat maps 33 are generated, and calculates the evaluation value from the heat map 33 generated about the target layer in step S23 and from the detection region 32 identified in step S22.

Specifically, the evaluation value calculation unit 22 calculates the evaluation value from a ratio of an activeness degree on an inside of the detection region 32 and an activeness degree on an outside of the detection region 32, the activeness degree being represented by the heat map about the target layer. In Embodiment 1, the evaluation value calculation unit 22 calculates, as the evaluation value, a proportion of a sum of activeness degrees on the inside of the detection region 32 to a sum of activeness degrees on the outside of the detection region 32.

In FIG. 4, assume that a pixel that is hatched darker has a higher activeness degree. In FIG. 4, there are many pixels hatched dark on the inside of the detection region 32, and there are a few pixels hatched less dark on the outside of the detection region 32. Therefore, a sum of activeness degrees on the inside of the detection region 32 is larger than a sum of activeness degrees on the outside of the detection region 32, and accordingly the evaluation value is 1 or more.

In this process, the proportion of the sum of the activeness degrees on the inside of the detection region 32 to the sum of the activeness degrees on the outside of the detection region 32 is calculated as the evaluation value. However, the evaluation value is not limited to this. For example, a proportion of the sum of the activeness degrees on the inside of the detection region 32 to a sum of activeness degrees of the entire image data 31 may be calculated as the evaluation value.

(Step S13 of FIG. 2: Layer Selection Process)

The layer selection unit 23 selects at least some layers out of the plurality of layers constituting the object detection model, on the basis of the evaluation value calculated in step S12.

Specifically, the layer selection unit 23 selects a criterial number of layers out of layers each having an evaluation value higher than an evaluation threshold value. Accordingly, when there are a criterial number or more of layers each having an evaluation value higher than the evaluation threshold value, the criterial number of layers are selected. On the other hand, when there are less than the criterial number of layers each having an evaluation value higher than the threshold value, every layer having an evaluation value higher than the evaluation threshold value is selected.

The evaluation threshold value is a value that is set in advance in accordance with how much a layer should contribute to detection of the target object so that it is treated as an analysis target, or the like. The criterial number is a value that is set in advance in accordance with the number of layers constituting the object detection model, or the like.

Figure 5:
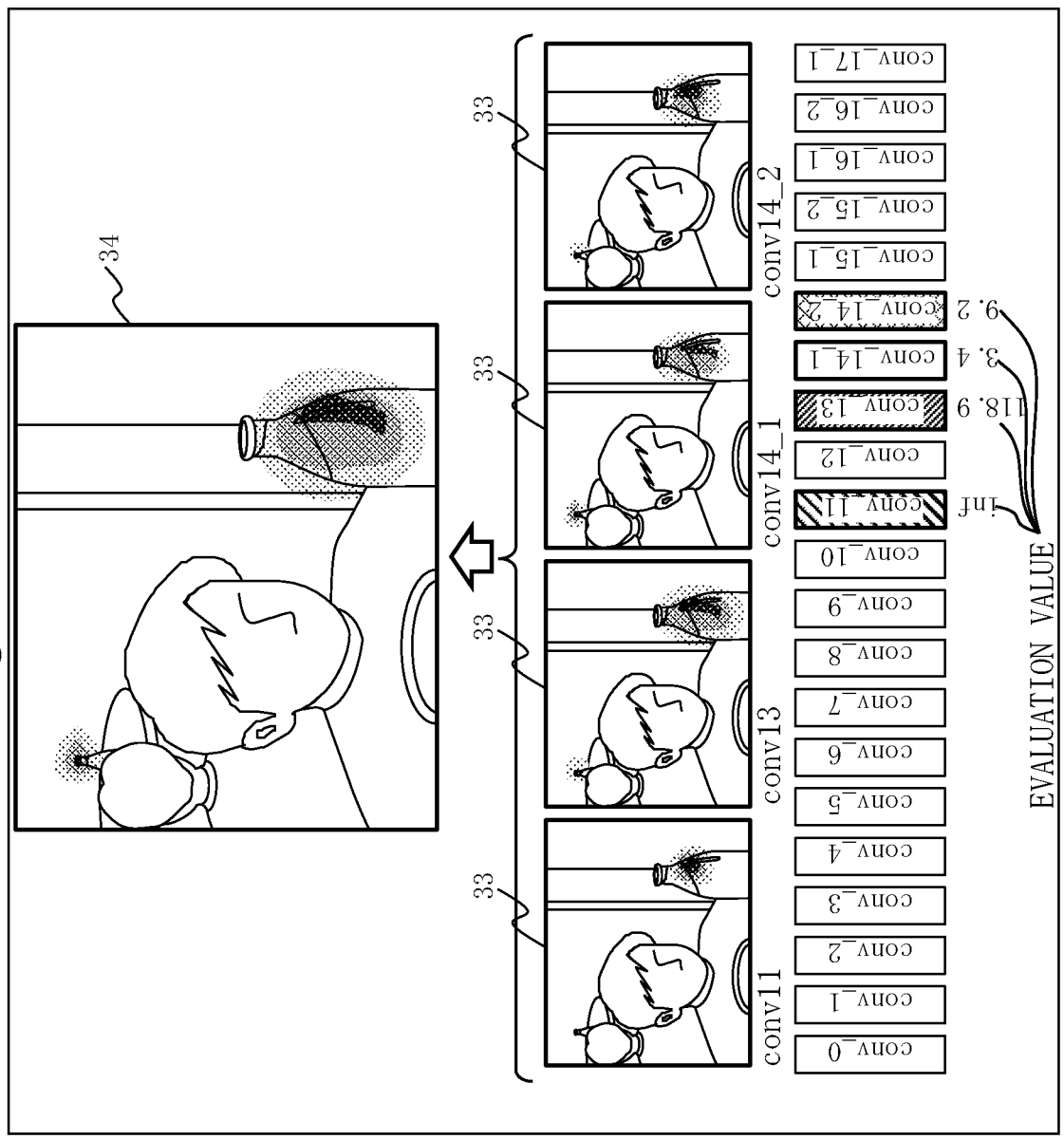
FIG. 5 is an explanatory diagram of a layer selection process and a synthesis process according to Embodiment 1.

In FIG. 5, out of layers ranging from a layer conv0 to a layer conv17_1, layers each having achieved an evaluation value higher than 1.0 being the evaluation threshold value are four layers which are the layer conv11, the layer conv13, the layer conv14_1, and the layer conv14_2. In FIG. 5, the evaluation value of the layer conv11 is expressed as inf. Note that inf indicates that all activated pixels are inside of the detection region 32 and that their evaluation values are infinity.

In FIG. 5, it is assumed that the criterial number is 5, and all of the four layers which are the layer conv11, the layer conv13, the layer conv14_1, and the layer conv14_2 are selected.

(Step S14 of FIG. 2: Synthesis Process)

The synthesis unit 24 synthesizes the heat maps 33 about the layers selected in step S13, thereby generating a synthesis map 34.

Specifically, the synthesis unit 24 focuses on each pixel of the image data 31 as the target pixel, and sets the highest activeness degree among activeness degrees of the target pixels represented by the individual heat maps about the plurality of layers selected in step S13, as the activeness degree of the target pixel in the synthesis map 34, thereby generating the synthesis map 34.

Figure 6:
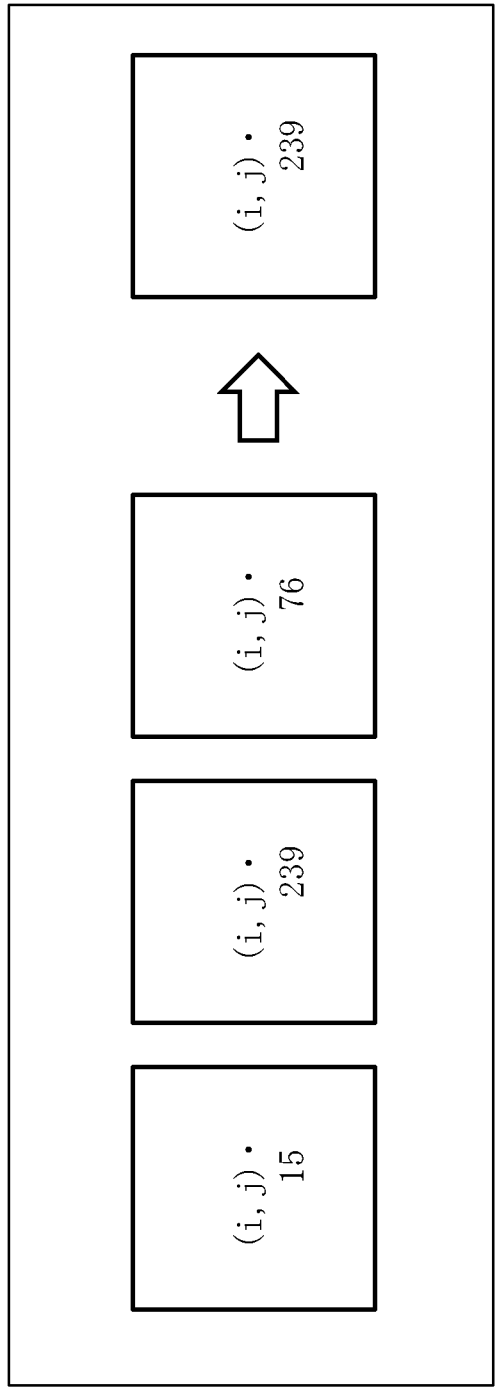
FIG. 6 is an explanatory diagram of the synthesis process according to Embodiment 1.

For example, as illustrated in FIG. 6, regarding a certain pixel $p_{i,j}$, assume that individual activeness degrees expressed by the heat maps about the selected layers are 15, 239, and 76. In this case, the activeness degree about the pixel $p_{i,j}$ in a synthesis map 34 is 239 which is the highest among 15, 239, and 76.

In FIG. 5, heat maps 33 about the four layers which are the layer conv11, the layer conv13, the layer conv14_1, and the layer conv14_2 are synthesized to generate a synthesis map 34. Hence, the activeness degree indicated by each pixel of the synthesis map 34 is the highest activeness degree among the layer conv11, the layer conv13, the layer conv14_1, and the layer conv14_2.

* Effect of Embodiment 1 *

As described above, the detection result analysis device 10 according to Embodiment 1 calculates, about each layer, the evaluation value from the heat map 33 and the detection region 32, and selects a layer on the basis of the evaluation value. This enables selection of a layer suitable for visualization.

About a certain layer, when a sum of activeness degrees on the inside of the detection region 32 is large, it signifies that a result of that layer is likely to have contributed to detection of a target object. In particular, about a certain layer, when a proportion of a sum of activeness degrees on the inside of the detection region 32 to a sum of activeness degrees on the outside of the detection region 32 is high, it signifies that a result of this layer is strongly reflected in a detection result of a target object. The proportion of the sum of the activeness degrees on the inside of the detection region 32 to the sum of the activeness degrees on the outside of the detection region 32 is an index that is used as the evaluation value in Embodiment 1.

Therefore, to select a layer having a high evaluation value signifies to select a layer suitable for visualizing a portion that is a basis of judgment by the object detection model.

The detection result analysis device 10 according to Embodiment 1 selects a layer suitable for visualization and generates the synthesis map 34. Therefore, it is possible to generate the synthesis map 34 appropriately representing a portion that is a basis of judgment by the object detection model. As a result, it is possible to appropriately analyze the object detection model.

An example of an analysis based on the synthesis map 34 according to Embodiment 1 will be described with referring to FIG. 7.

Figure 7:
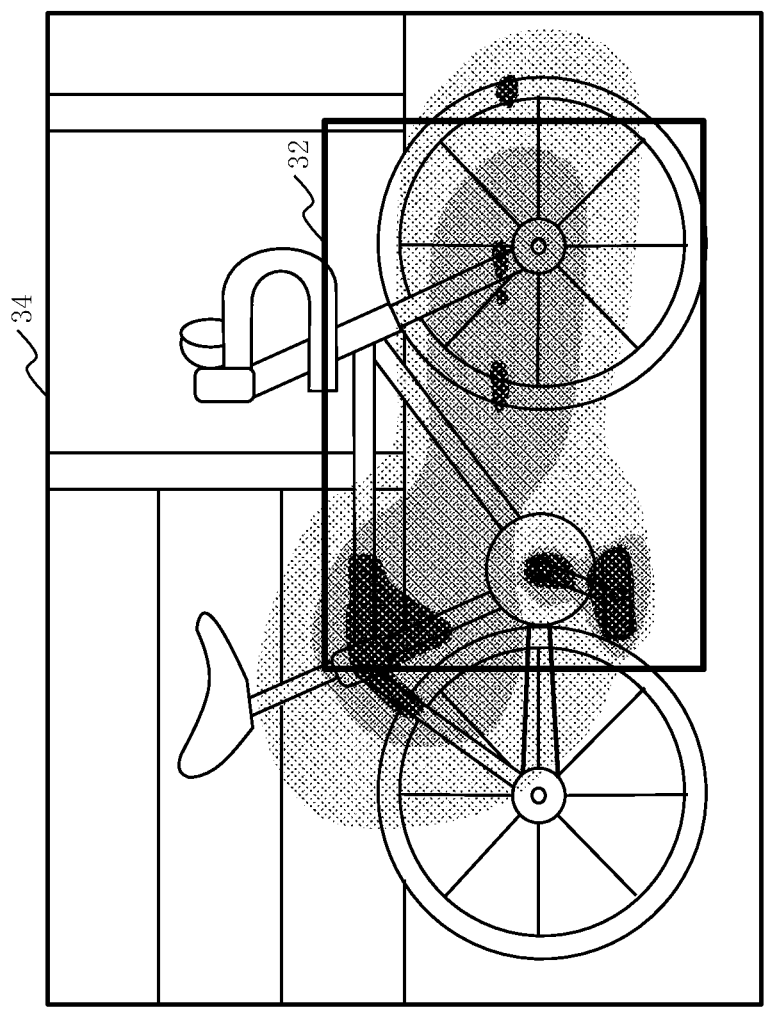
FIG. 7 is an explanatory diagram of an example of analysis based on a synthesis map 34 according to Embodiment 1.

In FIG. 7, a type of a target object is a bicycle. In FIG. 7, the entire bicycle is not identified as a detection region 32, but a portion covering from a front wheel to a vicinity of a chain wheel of the bicycle is identified as a detection region 32. That is, it is hard to say that the bicycle is appropriately detected by the object detection model.

In the synthesis map 34, a pedal, a crank, part of a frame, and part of the front wheel are the basis of judgment. Meanwhile, it can be seen that a handle, a saddle, and a rear wheel are not much utilized as the basis of judgment. From this result, it may be possible to provide the object detection model with learning data about the handle, the saddle, and the rear wheel which are not much utilized as the basis of judgment, and to cause the object detection model to learn the learning data.

In Embodiment 1, out of layers each having an evaluation value higher than the evaluation threshold value, a criterial number of layers are selected in step S13 of FIG. 2. The criterial number may be 1. Sometimes the criterial number is desirably 2 or more.

If the criterial number is 1, the synthesis unit 24 may output the heat map 33 about the selected layer as it is, as the synthesis map 34.

A case where the criterial number is desirably 2 or more will be described with referring to FIGS. 8 and 9.

Figure 8:
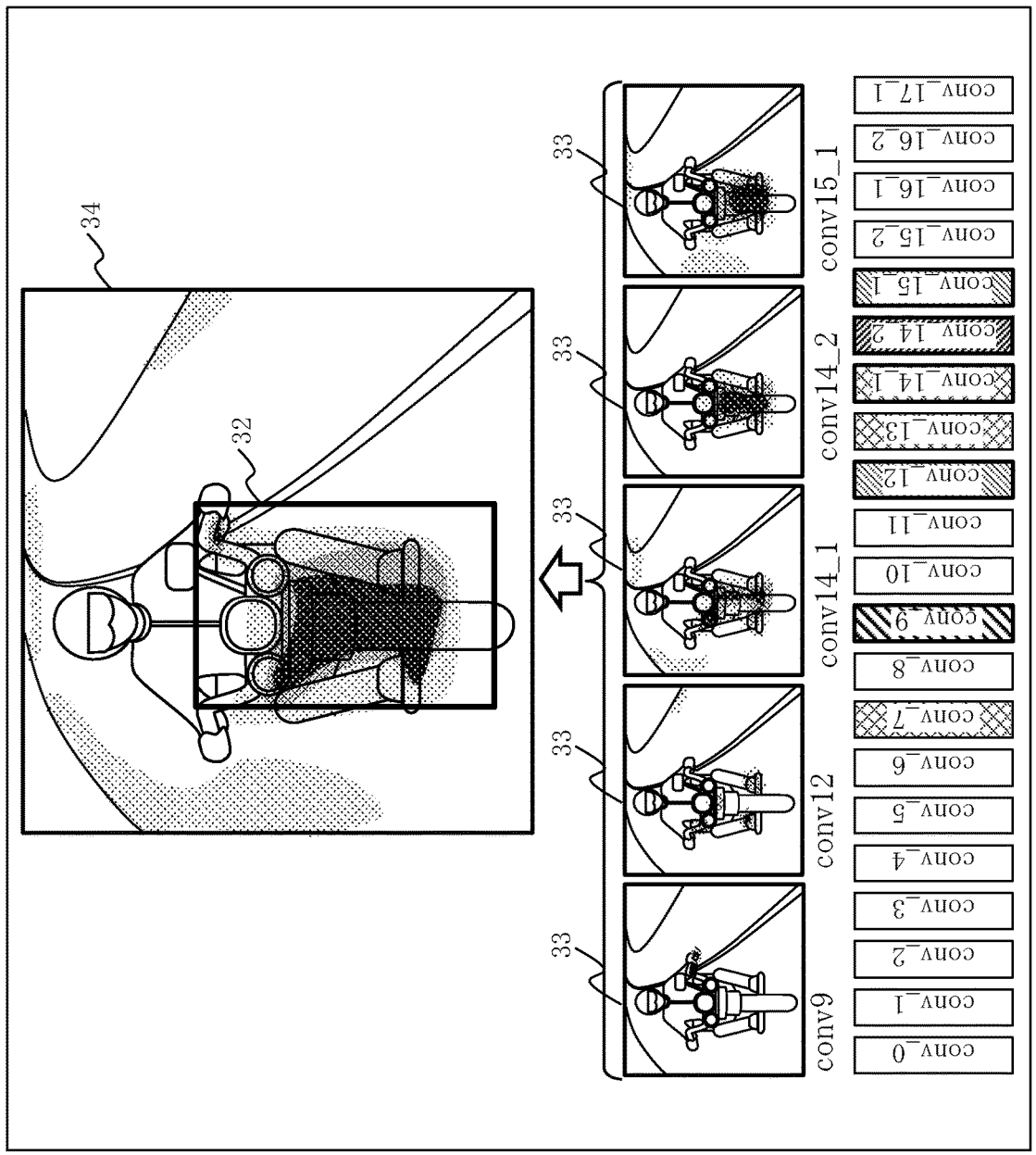
FIG. 8 is an explanatory diagram of a case where a criterial number is desirably 2 or more.

In FIG. 8, the type of the target object is a motorbike. In FIG. 8, assume that each of a layer conv7, a layer conv9, a layer conv12, a layer conv13, a layer conv14_1, a layer conv14_2, and a layer conv15_1 achieved an evaluation value higher than 1.0 which is an evaluation threshold value. In FIG. 8, it is assumed that the criterial number is 5. The layer conv9, the layer conv12, the layer conv14_1, the layer conv14_2, and the layer conv15_1 are selected, and a synthesis map 34 is generated. Consequently, it can be seen from the synthesis map 34 that the front wheel of the motorbike, a vicinity of the front wheel, and part of the handle are the portion that is the basis of judgment. In the case of motorbike, a bare wheel is often utilized as the basis of judgment, and it can be seen from the synthesis map 34 that judgment is made appropriately by the object detection model.

In FIG. 8, a layer having the highest evaluation value is the layer conv9. Therefore, if the criterial number is 1, that is, if selecting only a layer having the highest evaluation value, only the layer conv9 is selected. Then, from the synthesis map 34, it seems as if part of the handle is the portion that is the basis of judgment. In this manner, an evaluation value of a layer featuring only a narrow region becomes the highest, and there is a possibility that only a layer not necessarily appropriately representing a portion that is the basis of judgment is selected.

Figure 9:
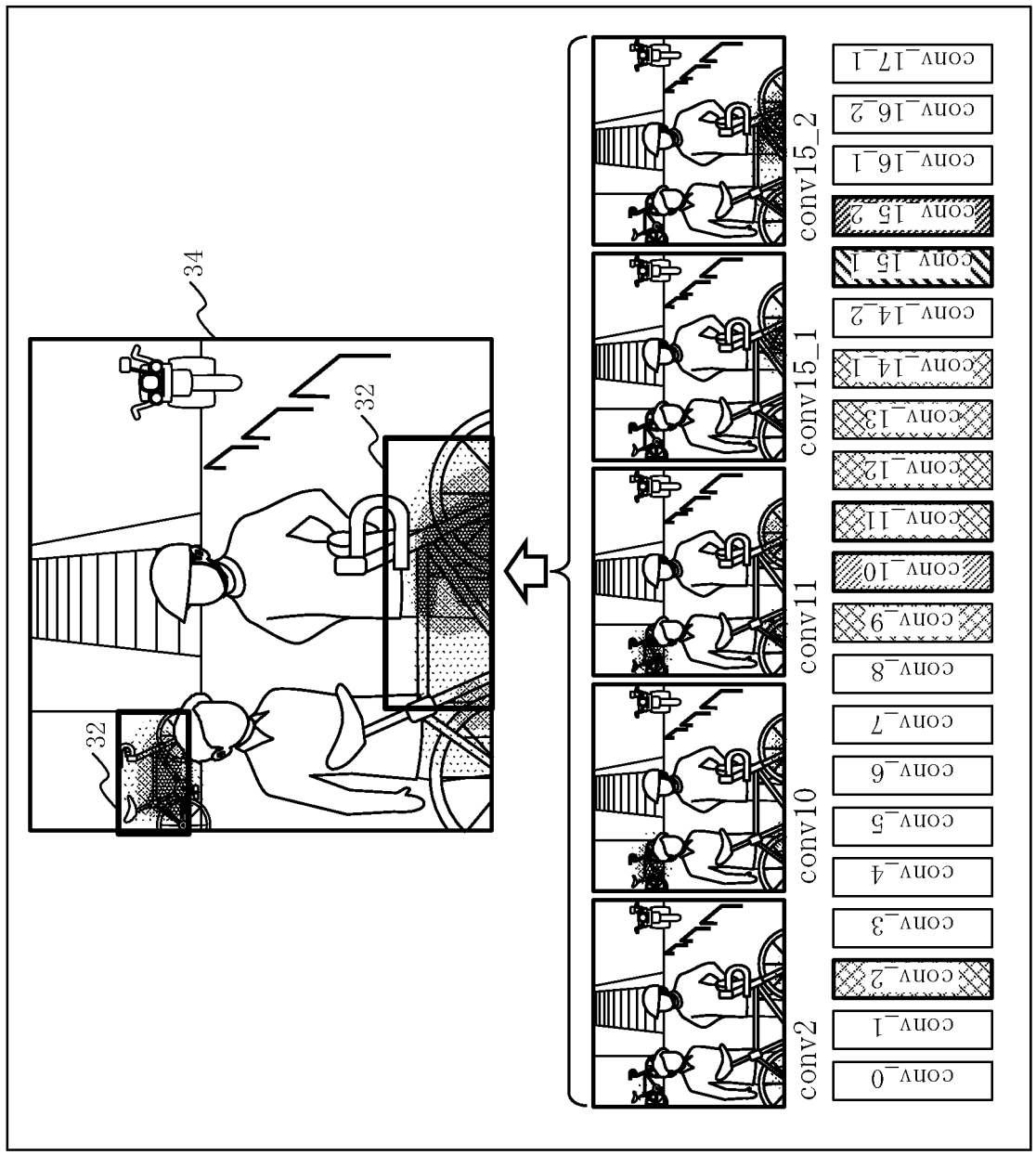
FIG. 9 is an explanatory diagram of a case where the criterial number is desirably 2 or more.

In FIG. 9, the type of the target object is a bicycle. Image data 31 of FIG. 9 contains two bicycles.

In FIG. 9. a layer having the highest evaluation value is a layer conv15_1. Therefore, if the criterial number is 1, that is, if selecting only a layer having the highest evaluation value, only the layer conv15_1 is selected. However, in the layer conv15_1, only a vicinity of a bicycle in front is activated, and a vicinity of a bicycle in the back is not activated. Hence, when there are a plurality of target objects in this manner, an evaluation value of a layer featuring only some target objects becomes the highest, and there is a possibility that only a layer not necessarily appropriately representing a portion that is the basis of judgment is selected.

* Other Configurations *

<Modification 1>

In Embodiment 1, the individual function components are implemented by software. However, Modification 1 may be possible in which the individual function components are implemented by hardware. This Modification 1 will be described regarding its difference from Embodiment 1.

Figure 10:
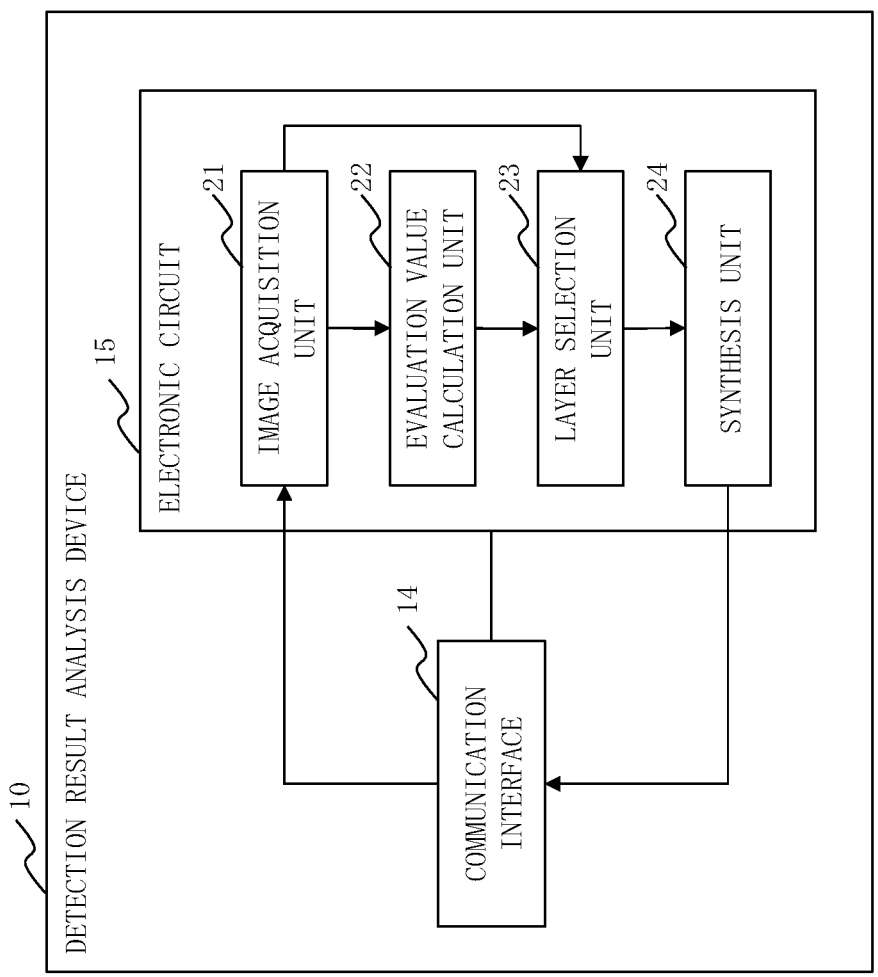
FIG. 10 is a configuration diagram of a detection result analysis device 10 according to Modification 1.

A configuration of a detection result analysis device 10 according to Modification 1 will be described with referring to FIG. 10.

When the individual function components are implemented by hardware, the detection result analysis device 10 is provided with an electronic circuit 15 in place of a processor 11, a memory 12, and a storage 13. The electronic circuit 15 is a dedicated circuit that implements the functions of the individual function components and the functions of the memory 12 and storage 13.

The electronic circuit 15 may be a single circuit, a composite circuit, a programmed processor, a parallel-programmed processor, a logic IC, a Gate Array (GA), an Application Specific Integrated Circuit (ASIC), or a Field-Programmable Gate Array (FPGA).

The individual function components may be implemented by one electronic circuit 15. The individual function components may be implemented by a plurality of electronic circuits 15 through distribution.

<Modification 2>

Modification 2 may be possible in which some of the function components are implemented by hardware and the other function components are implemented by software.

The processor 11, the memory 12, the storage 13, and the electronic circuit 15 are referred to as processing circuitry. That is, the functions of the individual function components are implemented by processing circuitry.

Embodiment 2

In Embodiment 2, an activeness degree of each pixel represented by a heat map 33 is subjected to n-value coding, and after that an evaluation value is calculated. This is where Embodiment 2 is different from Embodiment 1. Note that n is an integer of 2 or more. In Embodiment 2, this difference will be described, and the same point will not be described.

* Description of Operations *

Operations of a detection result analysis device 10 according to Embodiment 2 will be described with referring to FIGS. 11 and 12.

An operation procedure of the detection result analysis device 10 according to Embodiment 2 corresponds to a detection result analysis method according to Embodiment 2. A program that implements the operations of the detection result analysis device 10 according to Embodiment 2 corresponds to a detection result analysis program according to Embodiment 2.

An evaluation value calculation process according to Embodiment 2 will be described with referring to FIG. 11.

Processes of step S31 through step S33 are the same as the processes of step S21 through step S23 of FIG. 3.

Figure 11:
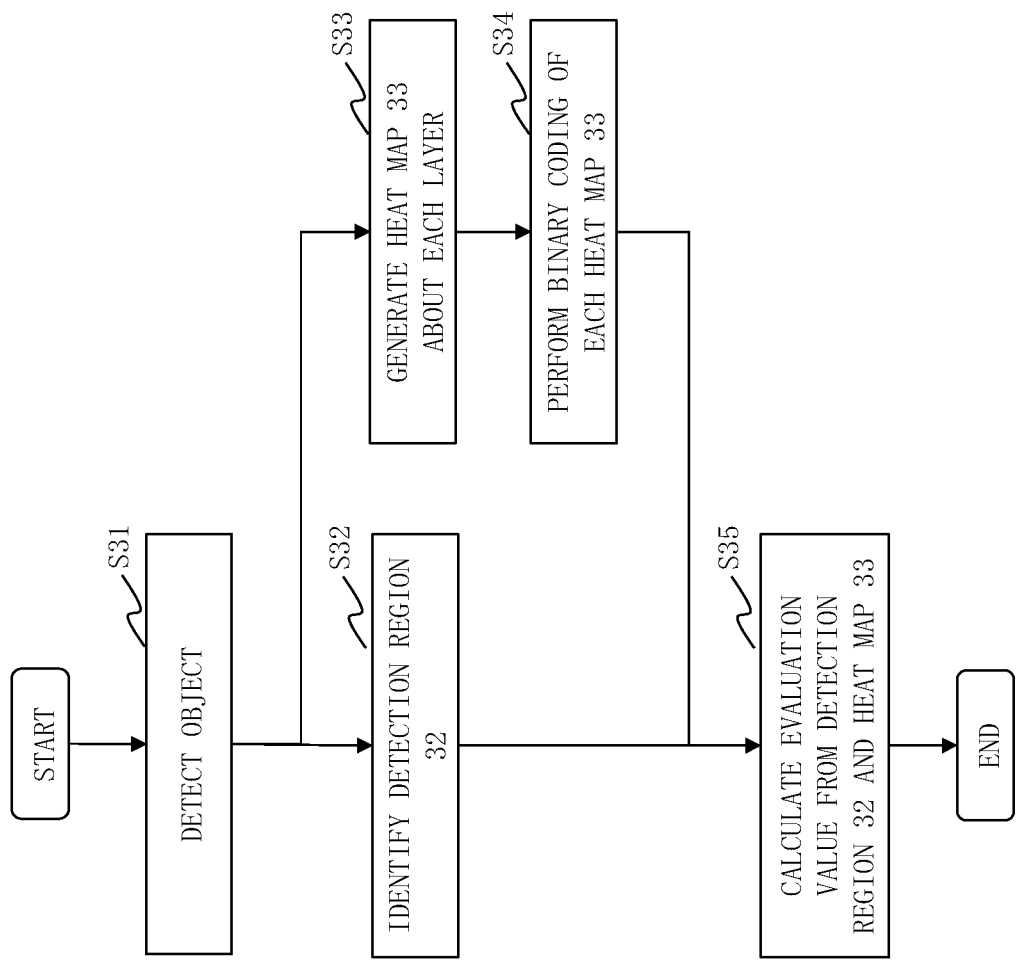
FIG. 11 is a flowchart of an evaluation value calculation process according to Embodiment 2.

(Step S34 of FIG. 11: N-value Coding Process)

An evaluation value calculation unit 22 performs n-value coding of a heat map 33 generated in step S33 for each layer. In Embodiment 2, the evaluation value calculation unit 22 performs binary coding of the heat map 33 of each layer.

Specifically, the evaluation value calculation unit 22 focuses on each pixel in the heat map 33, as a target pixel. If the activeness degree of the target pixel is higher than the activeness threshold value, the evaluation value calculation unit 22 converts the activeness degree of the target pixel into 1. If the activeness degree of the target pixel is equal to or less than the activeness threshold value, the evaluation value calculation unit 22 converts the activeness degree of the target pixel into 0. As a result, as illustrated in FIG. 12, activeness degrees of pixels hatched dark in the heat map 33 become 1, and activeness degrees of the other pixels become 0. In FIG. 12, a pixel having an activeness degree of 1 is expressed in white, and a pixel having an activeness degree of 0 is expressed in dark.

(Step S35 of FIG. 11: Evaluation Process)

The evaluation value calculation unit 22, by using the activeness degree after conversion in step S34, calculates, as an evaluation value, a proportion of a sum of the activeness degrees on the inside of the detection region 32 to a sum of the activeness degrees on the outside of the detection region 32.

Figure 12:
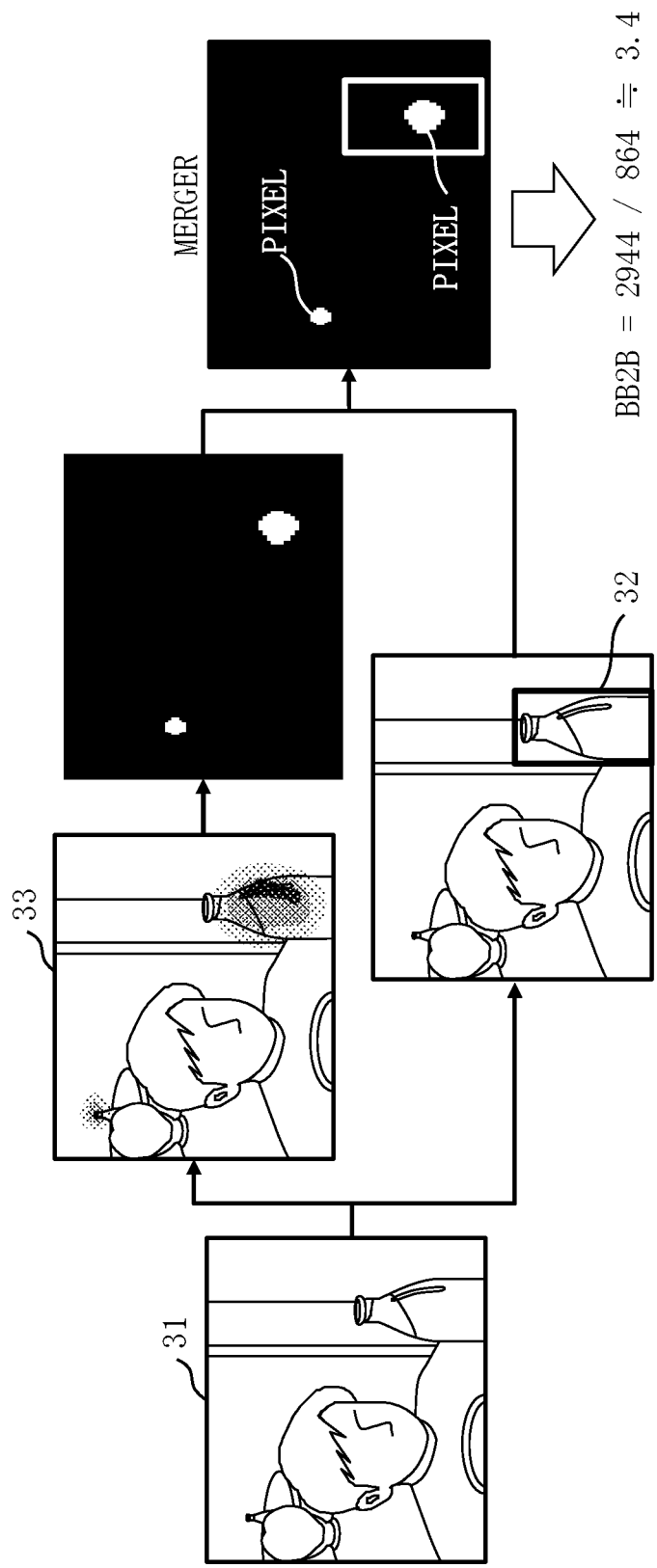
FIG. 12 is an explanatory diagram of a binary-coding process according to Embodiment 2.

In FIG. 12, on the outside of the detection region 32, there are 864 pixels each having an activeness degree of 1, and on the inside of the detection region 32, there are 2944 pixels each having an activeness degree of 1. Hence, the evaluation value is $2944/864 \approx 3.4$.

* Effect of Embodiment 2 *

As described above, the detection result analysis device 10 according to Embodiment 2 performs binary coding of the activeness degree of each pixel in the heat map 33, and after that calculates the evaluation value. With binary coding of the activeness degree, a significant layer has a higher evaluation value, and a non-significant layer has a lower evaluation value. This makes it possible to identify a layer that is more suitable for visualization.

In Embodiment 2, in an exemplification of binary coding, if the activeness degree is higher than the activeness threshold value, 1 is set as the conversion activeness degree. If the activeness degree is equal to or less than the activeness threshold value, 0 is set as the conversion activeness degree. An arbitrary value can be set as the conversion activeness degree of each activeness threshold value.

Figure 13:
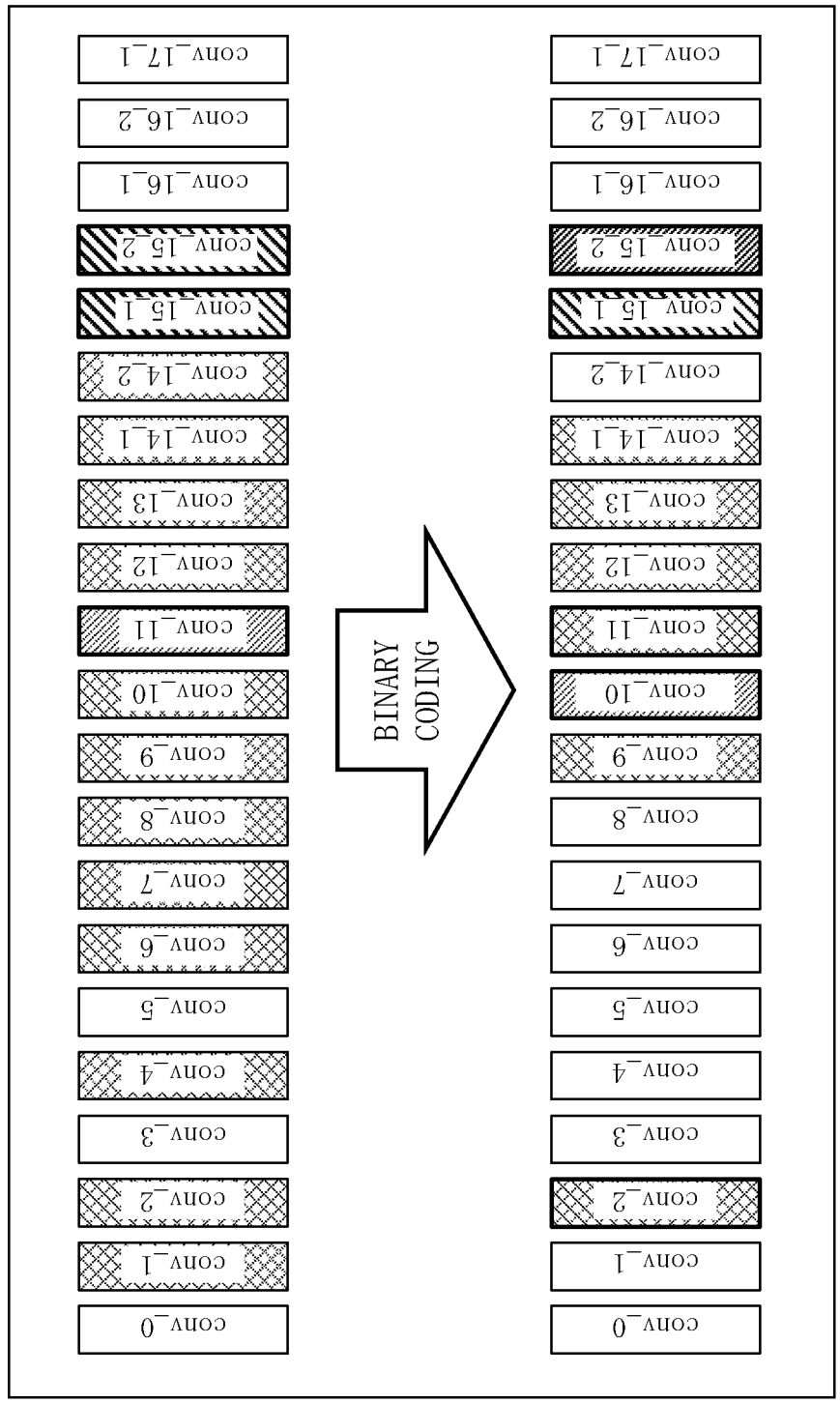
FIG. 13 is an explanatory diagram of an effect of binary coding according to Embodiment 2.

For example, as illustrated in FIG. 13, when binary coding is not performed, in many layers, the evaluation layer slightly exceeds 1.0 which is the evaluation threshold value. In contrast to this, when binary coding is performed, then in some layers having evaluation values slightly exceeding the evaluation threshold value, the evaluation value decreases to less than 1.0 which is the evaluation threshold value. Meanwhile, in a layer originally having a relatively high evaluation value, the evaluation value becomes much higher. As a result, a number of layers having evaluation values exceeding 1.0 which is the evaluation threshold value decreases.

* Other Configurations *

<Modification 3>

In Embodiment 2, the heat map 33 is subjected to binary coding. However, coding of the heat map 33 is not limited to binary coding, and n-value coding may be employed.

Figure 14:
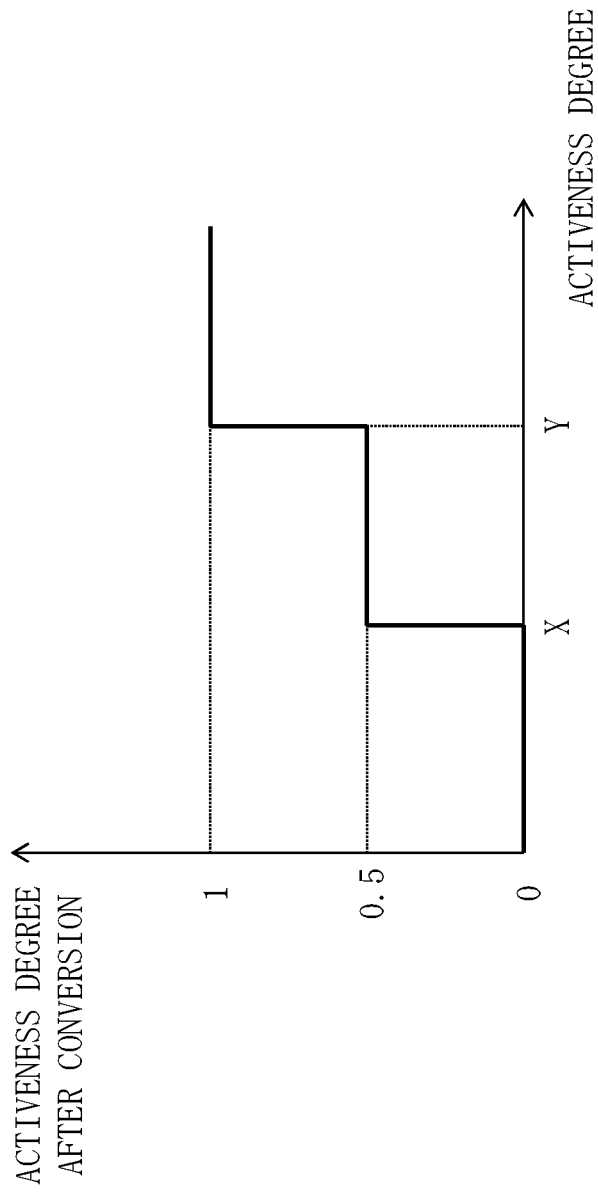
FIG. 14 is an explanatory diagram of a ternary coding process according to Modification 3.

For example, with ternary coding, an evaluation value calculation unit 22 uses two threshold values which are a threshold value X and a threshold value Y, as activeness threshold values. In this case, as illustrated in FIG. 14, for a pixel having an activeness degree equal to or lower than the threshold value X, 0 is set as the conversion activeness degree. For a pixel having an activeness degree higher than the threshold value X and equal to or lower than the threshold value Y, 0.5 is set as the conversion activeness degree. For a pixel having an activeness degree higher than the threshold value Y, 1 is set as the conversion activeness degree.

In this manner, with n-value coding, an activeness threshold value for n−1 is set, and a conversion activeness degree is set for each activeness threshold value. Regarding the n-value coding process, a conversion activeness degree is fixed for each range of activeness degree which is partitioned by i (0<i<n) and i−1. If the activeness degree is higher than the activeness threshold value for n−1, the activeness degree is converted into a conversion activeness degree corresponding to the activeness threshold value for n−1. If the activeness degree is equal to or lower than the activeness threshold value for −1 and higher than an activeness threshold value for n−2, the activeness degree is converted into a conversion activeness degree corresponding to the activeness threshold value for n−2.

For the sake of simplified calculation, for example, a conversion activeness degree corresponding to an activeness threshold value higher than n−1 is set to 1. A conversion activeness degree corresponding to an activeness threshold value for an activeness degree of n−n+1 (=1) or less is set to 0. Regarding an activeness degree of n−2 through 2, it is converted into a value between 1 and 0. This is how n-value coding is performed. Calculation can be simplified by setting a lower limit value of the conversion activeness degree to 0. The upper limit value of the conversion activeness degree is not limited to 1 but may be another value.

Also, n-value coding may be performed using an ReLU function with a shifted threshold value.

Figure 15:
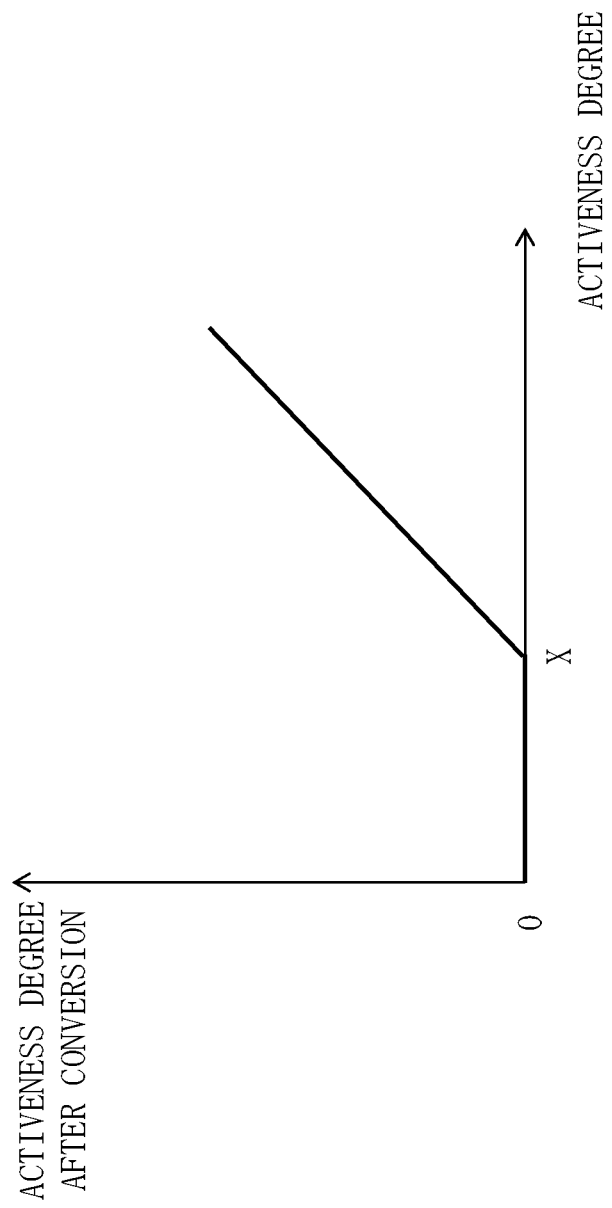
FIG. 15 is an explanatory diagram of an n-value coding process according to Modification 3.

Specifically, as illustrated in FIG. 15, regarding a pixel having an activeness degree equal to or lower than the evaluation threshold value X, 0 is set as the activeness degree. Regarding a pixel having an activeness degree higher than the evaluation threshold value X, the value of the activeness degree is maintained.

<Modification 4>

The detection result analysis device 10 in the individual embodiments may be applied to an object detection model used in an Automated guided vehicle (AGV). In an automated guided vehicle that employs an image recognition as a guidance method, the automated guided vehicle reads symbols written on the floor and ceiling, thereby grasping a position of itself. By applying the detection result analysis device 10 according to the individual embodiments to the object detection model used in the automated guided vehicle, an accuracy of the object detection model used in the automated guided vehicle can be improved. As a result, an automated guided vehicle that can move with a higher precision can be provided.

So far embodiments and modifications of the present invention have been described. Of these embodiments and modifications, several ones may be practiced by combination. One or several ones of these embodiments and modifications may be practiced partially. The present invention is not limited to the above embodiments and modifications, but various changes can be made to the present invention as necessary.

REFERENCE SIGNS LIST

10: detection result analysis device; 11: processor; 12: memory; 13: storage; 14: communication interface; 15: electronic circuit; 21: image acquisition unit; 22: evaluation value calculation unit; 23: layer selection unit; 24: synthesis unit; 31: image data; 32: detection region; 33: heat map; 34: synthesis map.

The invention claimed is:

1. A detection result analysis device comprising processing circuitry
to focus on, as a target layer, each of a plurality of individual layers in an object detection model which detects a target object included in image data and which is constituted using a neural network, and to calculate an evaluation value for each individual target layer, on a basis of a heat map representing an activeness degree per pixel in the image data obtained from an output result of the target layer, and on a detection region where the target object is detected, from a ratio of an activeness degree on an inside of the detection region and an activeness degree on an outside of the detection region, the activeness degree being represented by the heat map, and
to select at least some layers out of the plurality of layers on a basis of the calculated evaluation value for each individual target layer,
wherein the processing circuitry calculates the evaluation value from a proportion of a sum of activeness degrees on the inside of the detection region to a sum of activeness degrees on the outside of the detection region,
wherein the processing circuitry, if the activeness degree is higher than an activeness threshold value, converts the activeness degree into a conversion activeness degree corresponding to the activeness threshold value, and if the activeness degree is equal to or less than the activeness threshold value, converts the activeness degree into a conversion activeness degree corresponding to an activeness threshold value that is one-level lower than the activeness threshold value; and then calculates the evaluation value.

2. The detection result analysis device according to claim 1,
wherein the processing circuitry selects a criterial number of layers out of layers each having an evaluation value higher than an evaluation threshold value.

3. The detection result analysis device according to claim 2,
wherein the processing circuitry synthesizes heat maps about the selected layers, thereby generating a synthesis map.

4. The detection result analysis device according to claim 3,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

5. The detection result analysis device according to claim 1,
wherein the processing circuitry selects a criterial number of layers out of layers each having an evaluation value higher than an evaluation threshold value.

6. The detection result analysis device according to claim 5,
wherein the processing circuitry synthesizes heat maps about the selected layers, thereby generating a synthesis map.

7. The detection result analysis device according to claim 6,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

8. The detection result analysis device according to claim 1,
wherein the processing circuitry selects a criterial number of layers out of layers each having an evaluation value higher than an evaluation threshold value.

9. The detection result analysis device according to claim 8,
wherein the processing circuitry synthesizes heat maps about the selected layers, thereby generating a synthesis map.

10. The detection result analysis device according to claim 9,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

11. The detection result analysis device according claim 1,
wherein the processing circuitry synthesizes heat maps about the selected layers, thereby generating a synthesis map.

12. The detection result analysis device according to claim 11,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

13. The detection result analysis device according to claim 1,
wherein the processing circuitry synthesizes heat maps about the selected layers, thereby generating a synthesis map.

14. The detection result analysis device according to claim 13,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

15. The detection result analysis device according to claim 1,
wherein the processing circuitry synthesizes heat maps about the selected layers, thereby generating a synthesis map.

16. The detection result analysis device according to claim 15,
wherein the processing circuitry focuses on each pixel of the image data as a target pixel, and sets a highest activeness degree among activeness degrees of target pixels represented by individual heat maps about the selected some layers, as an activeness degree of the target pixel in the synthesis map, thereby generating the synthesis map.

17. A detection result analysis method comprising:
focusing on, as a target layer, each of a plurality of individual layers in an object detection model which detects a target object included in image data and which is constituted using a neural network, and calculating an evaluation value for each individual target layer, on a basis of a heat map representing an activeness degree per pixel in the image data obtained from an output result of the target layer, and on a detection region where the target object is detected, from a ratio of an activeness degree on an inside of the detection region and an activeness degree on an outside of the detection region, the activeness degree being represented by the heat map; and
selecting at least some layers out of the plurality of layers on a basis of the evaluation value for each individual target layer,
wherein said method calculates the evaluation value from a proportion of a sum of activeness degrees on the inside of the detection region to a sum of activeness degrees on the outside of the detection region,
wherein, if the activeness degree is higher than an activeness threshold value, said method converts the activeness degree into a conversion activeness degree corresponding to the activeness threshold value, and if the activeness degree is equal to or less than the activeness threshold value, converts the activeness degree into a conversion activeness degree corresponding to an activeness threshold value that is one-level lower than the activeness threshold value; and then calculates the evaluation value.

18. A non-transitory computer-readable recording medium recorded with a detection result analysis program which causes a computer to function as a detection result analysis device that performs:
an evaluation value calculation process of focusing on, as a target layer, each of a plurality of individual layers in an object detection model which detects a target object included in image data and which is constituted using a neural network, and calculating an evaluation value for each individual target layer, on a basis of a heat map representing an activeness degree per pixel in the image data obtained from an output result of the target layer, and on a detection region where the target object is detected, from a ratio of an activeness degree on an inside of the detection region and an activeness degree on an outside of the detection region, the activeness degree being represented by the heat map; and
a layer selection process of selecting at least some layers out of the plurality of layers on a basis of the evaluation value for each individual target layer calculated by the evaluation value calculation process,
wherein said detection result analysis device calculates the evaluation value from a proportion of a sum of activeness degrees on the inside of the detection region to a sum of activeness degrees on the outside of the detection region,
wherein, if the activeness degree is higher than an activeness threshold value, said detection result analysis device converts the activeness degree into a conversion activeness degree corresponding to the activeness threshold value, and if the activeness degree is equal to or less than the activeness threshold value, converts the activeness degree into a conversion activeness degree corresponding to an activeness threshold value that is one-level lower than the activeness threshold value; and then calculates the evaluation value.

* * * * *